(12) United States Patent
Lee et al.

(10) Patent No.: US 11,694,678 B2
(45) Date of Patent: Jul. 4, 2023

(54) SIGNAL PROCESSOR EMPLOYING NEURAL NETWORK TRAINED USING EVOLUTIONARY FEATURE SELECTION

(71) Applicant: General Dynamics Mission Systems, Inc., Fairfax, VA (US)

(72) Inventors: David Lee, Scottsdale, AZ (US); Scott Blanchard, Scottsdale, AZ (US); Nickolas Dodd, Scottsdale, AZ (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 255 days.

(21) Appl. No.: 17/064,807

(22) Filed: Oct. 7, 2020

(65) Prior Publication Data

US 2022/0108687 A1   Apr. 7, 2022

(51) Int. Cl.
| | |
|---|---|
| *G10L 15/16* | (2006.01) |
| *G06N 3/086* | (2023.01) |
| *G10L 15/06* | (2013.01) |
| *G06N 3/048* | (2023.01) |

(52) U.S. Cl.
CPC ............. *G10L 15/16* (2013.01); *G06N 3/086* (2013.01); *G10L 15/063* (2013.01); *G06N 3/048* (2023.01)

(58) Field of Classification Search
CPC ...... G06N 3/0481; G06N 3/086; G10L 15/16; G10L 15/063
See application file for complete search history.

(56) References Cited

U.S. PATENT DOCUMENTS

2019/0180186 A1* 6/2019 Liang ..................... G06N 3/04

OTHER PUBLICATIONS

Cuadra et al., "Reducing the computational cost for sound classification in hearing aids by selecting features via genetic algorithms with restricted search," 2008 International Conference on Audio, Language and Image Processing, 2008, pp. 1320-1327, doi: 10.1109/ICALIP.2008.4 (Year: 2008).*

Kwon et al., "Failure Prediction Model Using Iterative Feature Selection for Industrial Internet of Things," Symmetry 12, No. 3: 454, Mar. 12, 2020, https://doi.org/10.3390/sym12030454 (Year: 2020).*

(Continued)

*Primary Examiner* — Michelle M Koeth
(74) *Attorney, Agent, or Firm* — LKGlobal | Lorenz & Kopf, LLP

(57) ABSTRACT

The evolutionary feature selection algorithm is combined with model evaluation during training to learn feature subsets that maximize speech/non-speech distribution distances. The technique enables ensembling of low-cost models over similar features subspaces increases classification accuracy and has similar computational complexity in practice. Prior to training the models, feature analysis is conducted via an evolutionary feature selection algorithm which measures fitness for each feature subset in the population by its k-fold cross validation score. PCA and LDA based eigen-features are computed for each subset and fitted with a Gaussian Mixture Model from which combinations of feature subsets with Maximum Mean Discrepancy scores are obtained. During inference, the resulting features are extracted from the input signal and given as input to the trained neural networks.

3 Claims, 7 Drawing Sheets

(56) References Cited

OTHER PUBLICATIONS

Raymer et al., "Dimensionality reduction using genetic algorithms," in IEEE Transactions on Evolutionary Computation, vol. 4, No. 2, pp. 164-171, Jul. 2000, doi: 10.1109/4235.850656. (Year: 2000).*
Tan et al., A multi-objective evolutionary algorithm-based ensemble optimizer for feature selection and classification with neural network models, Neurocomputing, vol. 125, 2014, pp. 217-228, https://doi.org/10.1016/j.neucom.2012.12.057. (Year: 2014).*
Zamalloa et al., "Feature dimensionality reduction through Genetic Algorithms for faster speaker recognition," 2008 16th European Signal Processing Conference, 2008, pp. 1-5. (Year: 2008).*
Dash et al; "Feature selection for classification"; Intelligent Data Analysis, IOS Press, NL, vol. 1, No. 3, Jan. 1, 1997 (Jan. 1, 1997), pp. 131-156.
Xue et al; "A Survey on Evolutionary Computation Approaches to Feature Selection", IEEE Transactions on Evolutionary Computation, IEEE Service Center, New York, NY, US, vol. 20, No. 4, Aug. 1, 2016 (Aug. 1, 2016), pp. 606-626.
J. Ramirez, et al., Voice Activity Detection With Noise Reduction And Long-Term Spectral Divergence Estimation, Dept. of Electronics and Computer Technology, ICASSP, University of Granada, Spain, 2004.
Jongseo Sohn, et al, A Statistical Model-Based Voice Activity Detection, IEEE Signal Processing Letters, vol. 6, No. 1, Jan. 1999.
Santiago Pascual, et al, SEGAN: Speech Enhancement Generative Adversarial Network, Universitat Politècnica de Catalunya, Barcelona, Spain 2 Telefonica Research, Barcelona, Spain, Jun. 9, 2017.

* cited by examiner

SIGNAL PROCESSOR EMPLOYING NEURAL NETWORK TRAINED USING EVOLUTIONARY FEATURE SELECTION

TECHNICAL FIELD

The disclosure relates generally to signal processing, such as voice detection and speech signal processing. More particularly the disclosure relates to a neural network training technique using evolutionary feature selection. The technique may be applied to deep learning neural networks for improved handling signals containing speech.

BACKGROUND

This section provides background information related to the present disclosure which is not necessarily prior art.

In every communication system some noise will be present, making the desired signal more difficult to use. In a communication system intended for human speech, the presence of noise can degrade the utility of the speech signal in several ways. Noise can degrade the recognizability of the speech, making it harder to understand what is being said. Speech enhancement (SE) systems are sometimes used to improve recognizability. Noise can also degrade a system's ability to even detect that human speech is present to be processed. In this latter case, an automated voice activation detection (VAD) system, designed to open the channel only when speech is detected, may fail to open if the speech is masked by the noise. The intended purpose of VAD system is to avoid unnecessary coding or decoding during non-speech segments in the audio stream; but if it fails to detect that speech is present, those segments of the message may be lost.

To improve the intelligibility of speech, conventional speech enhancement (SE) systems attempt to remove the apparent effects of noise. This is typically done by segmenting the incoming signal into iteratively processed signal frames and then spectrally subtracting an estimate of the noise spectrum during each iteration. These systems encounter difficulties because the nature of the noise can unpredictably change from moment to moment. Some noise sources may have a recognizable signature, such as the clicking noise produced by spark plugs for example, and these are more readily dealt with. Other noise sources are more random in nature and can be very difficult to distinguish from the impulses produced by human speech. Random noises that resemble artifacts of human speech are very difficult to remove without removing some of the features of human speech that make the speech content recognizable.

The typical voice activation detection system operates by segmenting the incoming signal into a sequence of signal frames. The VAD processor then iterates over the signal frames, attempting to make a binary classification, over a contiguous set of signal frames, whether speech was present in that set of frames.

Whether the goal is speech enhancement or voice activation detection, designing algorithms that are robust both to noise level and various noise types, such as non-stationary noise environments, is a challenging problem. This is largely due to the inherent signal complexity of human speech and the unpredictability of noise.

SUMMARY

Here we present a deep learning approach to speech detection and enhancement based on a long short-term memory (LSTM) recurrent neural network (RNN). The LSTM RNN is capable of learning long range dependencies in the dynamics of the inputs, and the recurrent nature of the connections in the network gives rise to state in the nodes of the network. The techniques disclosed here may be adapted to other machine learning platforms.

An important ingredient for the success of a neural network system, indeed of any machine learning system, is its training. The LSTM-RNN processor disclosed here is trained using training data that are expressed in a uniquely selected set of automatically generated and diverse feature parameters. An evolutionary selection process implemented using a genetic algorithm automates the feature set selection process. The evolutionary selection process is designed to produce minimally redundant, maximally relevant feature subsets that made up the input feature space. The LSTM-RNN so configured and trained mitigates noise and interference with minimal computational processing and latency from voice signals; and works with multiple languages in non-stationary noise environments.

When the training data are expressed using this uniquely selected feature space and then used to train the neural network, the resulting neural network is able to discriminate between speech signals and noise far better than conventionally trained neural networks.

More specifically, prior to training the models, feature analysis is conducted via an evolutionary feature selection algorithm which measures fitness for each feature subset in the population by its k-fold cross validation score. PCA and LDA based eigen-features are computed for each subset and fitted with a Gaussian Mixture Model from which combinations of feature subsets with Maximum Mean Discrepancy scores are obtained. During inference, the resulting features are extracted from the input signal and given as input to the trained neural networks.

The evolutionary feature selection algorithm is combined with model evaluation during training to learn feature subsets that maximize speech/non-speech distribution distances. The technique enables ensembling of low-cost models over similar features subspaces increases classification accuracy and has similar computational complexity in practice.

In one respect, the disclosed technology provides a signal processing apparatus employing a signal processor having an input port to receive input signals to be processed and an output port to send processed output signals. The processor implements a neural network that processes the input signals according to decision making criteria learned by exposure to a corpus of training data. The neural network is configured to receive the corpus of training data from an evolutionary feature selection system which includes a genetic algorithm processor programmed (a) to examine a pool of training data expressed in a plurality of different types of feature parameter sets, (b) to select certain feature parameter sets determined through genetic selection to have higher fitness than the remainder of the feature parameter sets, and (c) to supply data from the pool of training data expressed in the selected higher fitness feature parameter sets as the corpus of training data.

In another respect, a method for using a neural network to process speech signals is disclosed. The method involves providing a corpus of data containing speech and non-speech, and also providing a collection of feature sets, each representing a different way to express a signal to be processed in terms of a feature vector. Evolutionary feature selection is then performed using a genetic algorithm to evolve from the collection of feature sets, a subset collection of feature sets that maximizes a distribution distance between speech and non-speech. Features corresponding to the subset collection of feature sets are extracted from the corpus of data to develop training data. These training data are then applied to a neural network to develop a learned model. The learned model is deployed in a processing system, configured to extract from an input signal, features corresponding to the subset collection to be processed by the neural network based on the learned model.

In yet another respect, the disclosed technology provides a method for training a neural network by providing a population of feature space transformations represented by plural feature subsets and then performing feature analysis on the pool using an evolutionary feature selection process which measures fitness for each feature subset in the population based on a validation score to cull an optimal feature subset. A corpus of training data is then provided and expressed using the culled optimal feature subset. The training data so expressed is then supplied to train the neural network.

The method further includes computing eigen-features for each subset to which is fitted a Gaussian Mixture Model from which combinations of feature subsets with maximum mean discrepancy scores are obtained to produce resulting features. The eigen-features may be produced by performing dimensionality reduction, such as principal component analysis, Linear Discriminant Analysis, and combinations thereof.

The plural feature subsets may be selected from the group consisting of spectral-based features, non-spectral-based features, cepstral-based features, long-term spectral divergence features, spectral entropy-based features, auto-correlation-based features, pitch frequency-based features, and combinations thereof.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Introduction

Figure 1:
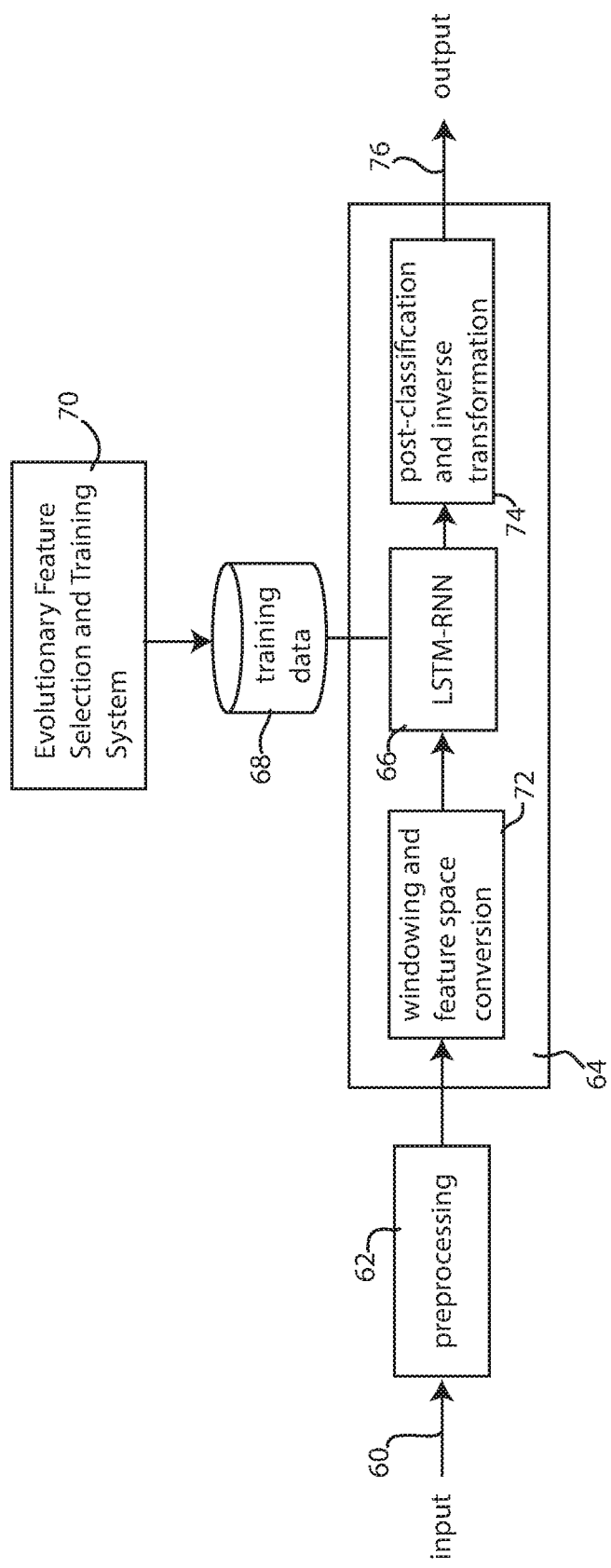
FIG. 1 is a schematic block diagram of a neural network signal processor, showing how the training data for the processor are supplied by an evolutionary feature selection and training system.

The neural network and evolutionary feature selection concepts will be described here in the context of processing speech. While speech signals are used in this description, the disclosed technology is not limited to the speech applications. Rather, the disclosed techniques, using suitably trained models as described here, can be employed to improve any message intelligibility, to differentiate such message from non-message content and to improve signal-to-noise ratio in a wide range of different communication modes. Thus, an important objective of the disclosed signal processor and evolutionary feature selection method is to better differentiate between signal and noise.

To perform this task, a trained model-based signal processor, such as a neural network processor, is used. The neural network processor is initially trained, prior to use, to differentiate between what shall be the desired signal and the noise that is expected to be present in the communication channel or path. To work effectively, the processor's models must be trained using training data that are optimized to meet the signal processor's design objective—to differentiate between signal and noise—in a robust and computationally efficient manner. As will be described in detail below, the neural network processor is trained using training data that are generated using an evolutionary feature selection process. Specifically, the training data are generated by a processor running a genetic algorithm that generates one or more training data sets that are optimized to produce minimally redundant, maximally relevant feature subsets. Using these training data, the neural network is trained to discriminate between signal and noise in a computationally efficient manner.

Computational efficiency is very important if the incoming data stream is to be processed without introducing unacceptable latency. In many applications, a human or automated control system will be digesting the data stream in order to make time-critical decisions, often immediate decisions in real time. If the data stream is delayed, then the reaction time by the human or automated control system is degraded, and in some cases such reaction delay can be highly detrimental to the mission. Latency can also adversely impact the performance of communication systems that rely on detection of the onset of speech such as transceiver squelch circuits and voice activated switch (VOX) circuits. Such circuits are used to open or close the communication channel to avoid using unnecessary bandwidth when no speech is present in a given audio stream.

The signal processor described here employs a deep learning neural network utilizing specially crafted training data that are generated using an evolutionary feature selection algorithm implemented by a processor programmed to perform a genetic algorithm. The disclosure below describes both the evolutionary feature selection algorithm and a bi-directional LSTM-RNN (long short-term memory, recurrent neural network) embodiment, trained using features generated by the selection algorithm.

By way of brief introduction, at a high level the evolutionary feature selection algorithm enables the learning of minimally redundant, maximally relevant feature subsets that make up the input feature space to the LSTM-RNN. The feasible search space for the algorithm may consist not only of any possible linear combination of the features that are explicitly coded in, but also the results of linear transformations applied to these (possibly linearly combined) features. The main example of the latter is the formation of eigen-features from projections resulting from the use of PCA and LDA on a given feature subset. Since the search space is infinite and suffers from the problem of combinatorial explosion, the disclosed evolutionary feature selection provides a way to intelligibly progress through the feature subset space in an efficient manner.

In one embodiment, the genetic algorithm combines feature evaluation with the neural network's learning algorithm to form a feedback loop in a wrapper style metaheuristic approach. On each iteration, the genetic algorithm performs the next round of subset feature selection and uses the k-fold cross validation accuracy score as its fitness function. For each selected feature set, an LDA and PCA based eigen-feature are computed which are then fitted with a Gaussian Mixture Model (GMM). A search is then done to find the optimal linear combination of the fitted GMM model parameters that produce an optimal threshold value for classification. A meta-search is then performed in order to discover combinations of feature spaces which can be ensembled together to achieve more accurate results.

The disclosure features a bi-directional long short-term memory (LSTM) recurrent neural network (RNN) architecture, trained for speech detection and enhancement. The neural network can handle non-stationary noise and is language and dialect agnostic; and can been implemented and optimized in C++ in order to run efficiently on a host embedded radio environment.

Overview of the Evolutionary Selection Processor

Referring to FIG. 1, a basic circuit for utilizing the evolutionary feature selection mechanism is illustrated. The illustrated circuit may be used for processing any information stream, such as a digital audio data stream containing speech for processing. The basic circuit is not limited to processing speech signals, however. Essentially any signal can be processed with the illustrated circuit, upon suitable training.

The input information stream at 60 is fed through an optional preprocessor 62, which performs signal conditioning of the input stream prior to being fed to the main runtime processor 64. If the input signal at 60 is in the analog domain, the preprocessor 62 may include analog-to-digital convertors, for example. Other types of signal conditioning may also include signal processing performed by upstream legacy transceiver systems.

In the illustrated embodiment, the main runtime processor 64 is implemented using a bi-directional long short-term memory, recurrent neural network (LSTM-RNN) 66, although other artificial intelligence or machine learning architectures may be used. The neural network 66 operates using training data 68. These training data 68 are supplied by the evolutionary feature selection and training mechanism or system 70.

The precise configuration of the main runtime processor 64 is specifically configured based on the task it is designed to perform. For illustration purposes, the runtime processor 64 includes a processor 72 that performs windowing on the input data stream, to segment and buffer the data into neighborhoods. Processor 72 also transforms the input data into feature space parameters corresponding to the feature space represented by the training data 68.

The neural network 66 classifies the data received from processor 72, effectively ascertaining, for each window or neighborhood, what is the likelihood score (0% to 100%) that the data belongs to a group defined by the training data 68. Then based on this classification, the results are processed at 74 according to the goals of the application and the results are inverse transformed from feature space back into a form usable by the application (e.g., time domain).

Examples of Systems where the Evolutionary Selection Process is Helpful

Before describing the evolutionary feature selection system and LSTM-RMM in greater detail, a basic understanding of some exemplary use cases for the technology may be helpful. Thus, next presented is a brief discussion of two exemplary signal processing applications that can benefit by using a deep learning neural network signal processing system that has been trained using features selected by the evolutionary feature selection system.

Voice Activation Detection

Voice Activity Detection (VAD) is a fundamental preprocessing task in many speech processing applications. This is primarily due to the fact that squelching transmissions in the absence of voice data reduces bandwidth by avoiding unnecessary coding for the non-speech segments detected in a given audio stream. A motivating example is push-to-talk radios. Designing VAD algorithms that are robust both to noise level and various noise types, such as non-stationary noise environments, is a challenging problem. At a fundamental level, the Voice Activity Detection problem can be viewed as a binary classification task on a contiguous set of signal frames, which will be referred to in this disclosure as signal neighborhoods. Given an input signal, the processor advances sequentially over these signal neighborhoods and decides at each time step whether speech was present or not using the methods discussed below.

Figure 2:
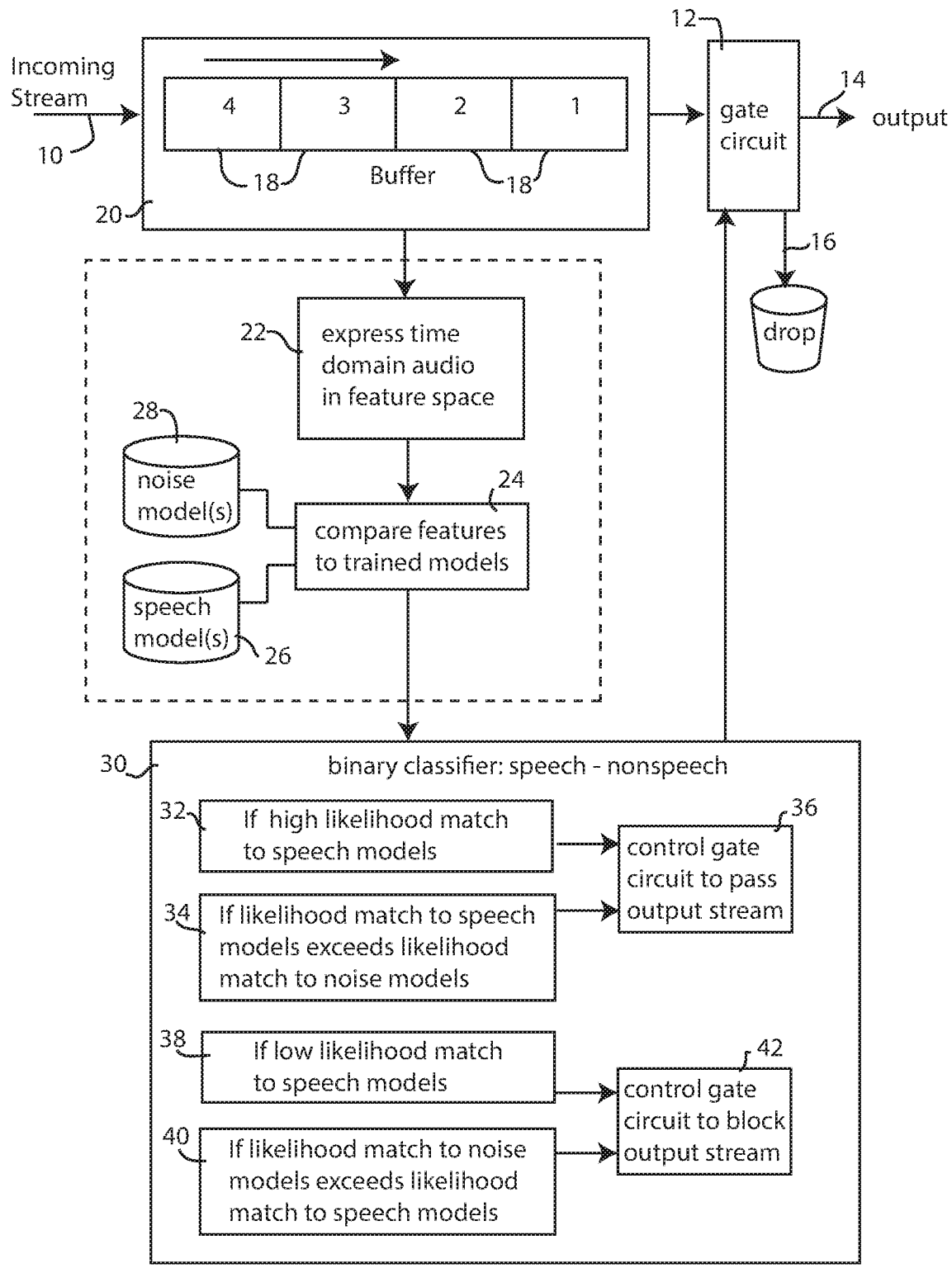
FIG. 2 is a block diagram of an example voice activation detection (VAD) circuit, useful in understanding how the neural network processor and evolutionary feature selection and training system can be used in a practical application.

Referring to FIG. 2, an exemplary voice activation detection (VAD) system processes an incoming stream of data at 10. The voice activation detection system detects when speech is present in the incoming signal, and in the illustrated system, a gate circuit 12 allows the incoming signal to pass to the output at 14 when speech is present. The gate circuit 12 blocks the incoming stream from reaching the output 14 when speech is not present in the incoming stream. Essentially, when speech is not present, the data comprising the incoming stream are discarded or dropped as depicted at 16.

In the illustrated voice activation detection system, the incoming stream 10 is sampled into equal sized chunks of data that are stored in consecutive frames 18 in a buffer circuit 20. In a typical embodiment, the incoming stream comprises digital audio data expressed in the time domain, where each frame stores a predefined number of milliseconds of time-varying signal data. Effectively the buffer effects a windowing process that segments the incoming stream into windows, which can then be grouped into signal neighborhoods. The voice activation detection circuit is configured to analyze whether a given neighborhood contains speech, or not, and controls the operation of the gate circuit 12 accordingly.

In order to use the evolutionary feature selection system, the voice activation detection system transforms or expresses the time-domain data in each signal neighborhood (i.e., the data stored in each frame 18 of buffer circuit 20) into a different domain, known as feature space. This transformation occurs at domain transformation processing block 22, which changes time-domain data into a form that uses uniquely selected features specified by the evolutionary feature selection mechanism that will be explained below.

Because any given buffered frame of data (neighborhood) may contain speech, non-speech (noise) or both, the domain transformation processing block 22 converts all data present in each neighborhood into data expressed in feature space. A comparison processing block 24 then examines each neighborhood of feature space data to determine if speech is present. In the illustrated embodiment, the comparison processing block 24 is utilizes one or more trained models, containing information, generated by the evolutionary feature selection mechanism, describing what exemplary speech looks like in feature space—trained speech models 26, and also optionally what exemplary non-speech or noise looks like in feature space—trained noise models 28.

In a neural network implementation, the neural network will typically have been trained a priori based on training data representing the models 26 and 28 and thus the comparison processing 24 results as a consequence of processing the input signal through the different layers of the neural network. Thus the representation given in FIG. 2 (and also in FIG. 3) is intended simply to show conceptually that the processor is able to differentiate between signals and noise based on having been trained to do so.

The comparison processing block 24 assesses each neighborhood of feature space data and computes the likelihood that the neighborhood being examined belongs to the speech model 26. The comparison processing block in this example also computes the likelihood that the neighborhood belongs to the noise model 28. The resultant likelihood scores result in a determination whether the neighborhood contains speech or not.

The likelihood scores from the comparison processing block 24 are fed to a binary classifier processor 30 that examines the likelihood scores for the respective speech and noise models and controls the gate circuit 12 to pass or block the incoming stream based on that assessment. If the speech likelihood score is high as at 32, or if the likelihood match to speech models exceeds the likelihood match to noise models at 34, the classifier 30 sends a control signal at 36 to cause the gate circuit 12 to pass the incoming stream 10 to the output 14. On the other hand, if the speech likelihood score is low as at 38, or if the likelihood match to noise models exceeds the likelihood match to the speech models at 40, the classifier 30 sends a control signal at 42 to cause the gate circuit 12 to block the incoming stream from reaching the output 14.

The foregoing represents one example of how speech and non-speech models may be used to classify the incoming stream to make a binary decision of whether speech is present or not. Other algorithms are possible.

Speech Enhancement

Speech Enhancement (SE) seeks to improve the quality and intelligibility of speech by removing non-speech background noise from the signal, which is a crucial component of most automatic speech recognition systems. Most simple SE algorithms attempt to remove additive noise by spectrally subtracting an estimate of the noise spectrum during each iteration. In many speech enhancement algorithms, a front-end VAD algorithm is used during noise estimation, which serves as a stepping block in the noise filtering process. In traditional speech enhancement, frames of the speech signal which do not contain speech, identified through the VAD component, are used to continually re-estimate the noise estimate.

Figure 3:
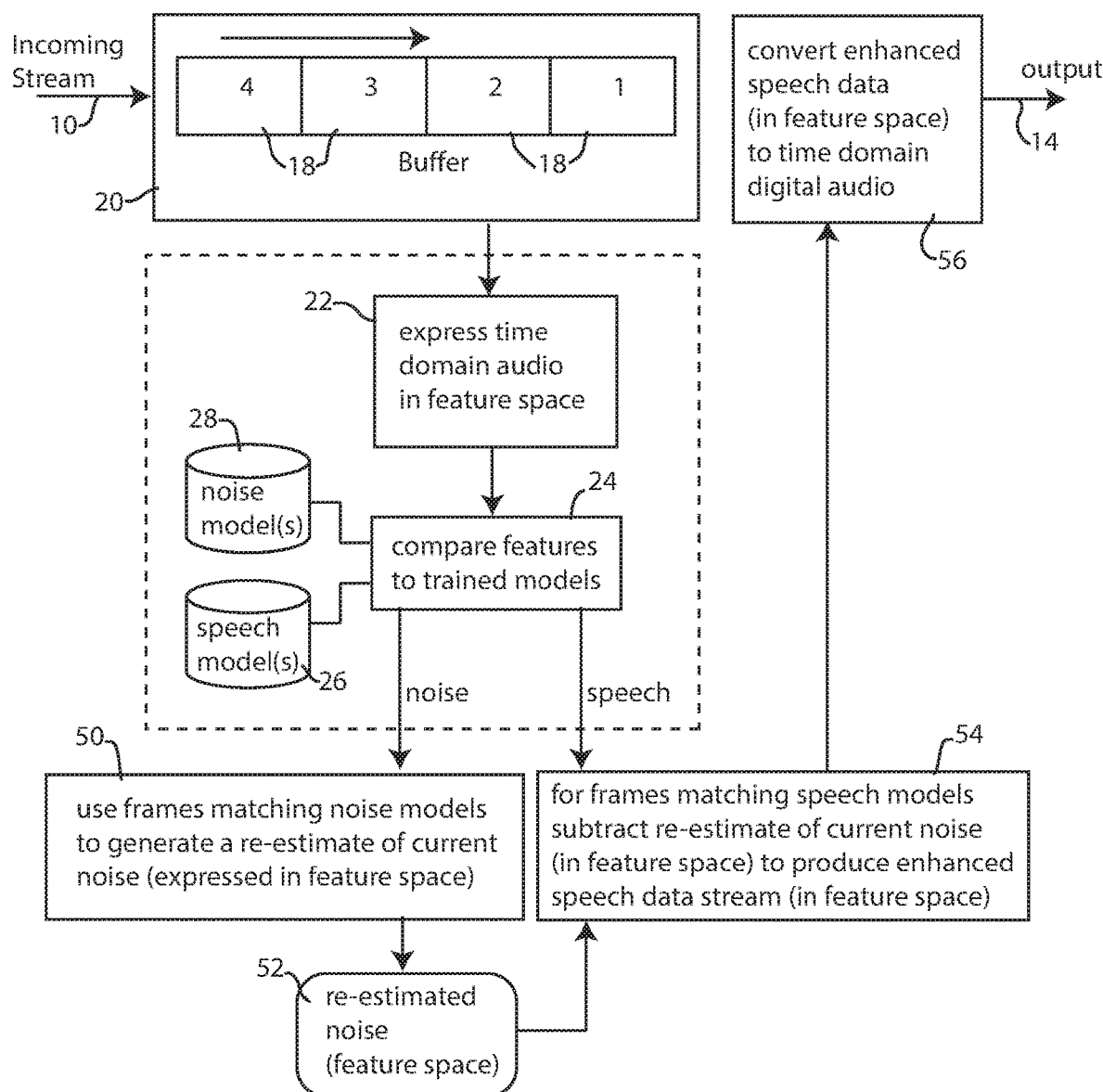
FIG. 3 is a block diagram of an example speech enhancement (SE) circuit, useful in understanding how the neural network processor and evolutionary feature selection and training system can be used in another practical application.

Referring to FIG. 3, an exemplary speech enhancement circuit is illustrated to show another example of the disclosed evolutionary feature selection technology. The circuit processes an incoming stream 10 to reduce or remove the effects of noise within the stream. As illustrated the incoming stream 10 may be sampled into equal sized chunks of data that are stored in consecutive frames 18 in a buffer circuit 20. As with the VAD circuit above, the data stored in buffer 20 are converted by transformation processing block 22 into feature space representation. The feature space frames, or neighborhoods are then compared by comparison processing block 24 with the trained speech models 26 and trained noise models 28. As with the VAD circuit, these trained models are generated using features carefully selected by the automated evolutionary feature selection mechanism discussed below.

The comparison processing block 24 provides two logic streams, one based on whether a given frame or neighborhood matches the noise model(s) and one based on whether the given frame or neighborhood matches the speech model(s). In both logic streams, whether the data matches a model is based on the likelihood score that the observed frame or neighborhood data can be produced by the model.

If the likelihood score for a given frame or neighborhood is high for the noise model(s) 28, as at 50, then the data for that frame or neighborhood are used to re-estimate the noise, which is expressed in feature space, as at 52. Whereas the noise models 28 were generated a priori, by the evolutionary feature selection mechanism, the re-estimated noise is based on channel noise that is actually present in the frame or window. In this regard, the noise actually present could be essentially the same as represented in the noise models 28, but it could also be different, depending on conditions at that time. This re-estimated noise is stored in a buffer at 52 for subsequent use in processing speech-bearing frames or neighborhoods. If desired, the re-estimated noise can also be fed back to a training system to update the noise models 28.

If the likelihood score for a given frame or neighborhood is high for the speech models 26, as at 54, then the data for that frame is filtered. Based on the features extracted from the audio samples, the LSTM RNN generates a set of filter coefficients and VAD to remove, i.e., filter, the non-desirable speech signals.

In order to render the clean speech data useable at the circuit output 14, inverse transformation processing block 56 converts the clean speech data back into time-domain digital audio data. The inverse transformation processing block 56 performs the inverse of the operations performed by the transformation processing block 22.

The foregoing represents one example of how speech and noise (non-speech) models may be used to classify the incoming stream to enhance the speech signal by removing or substantially diminishing the effect of the noise component. Other algorithms are possible.

Neural Network Deep Learning Model

Figure 4:
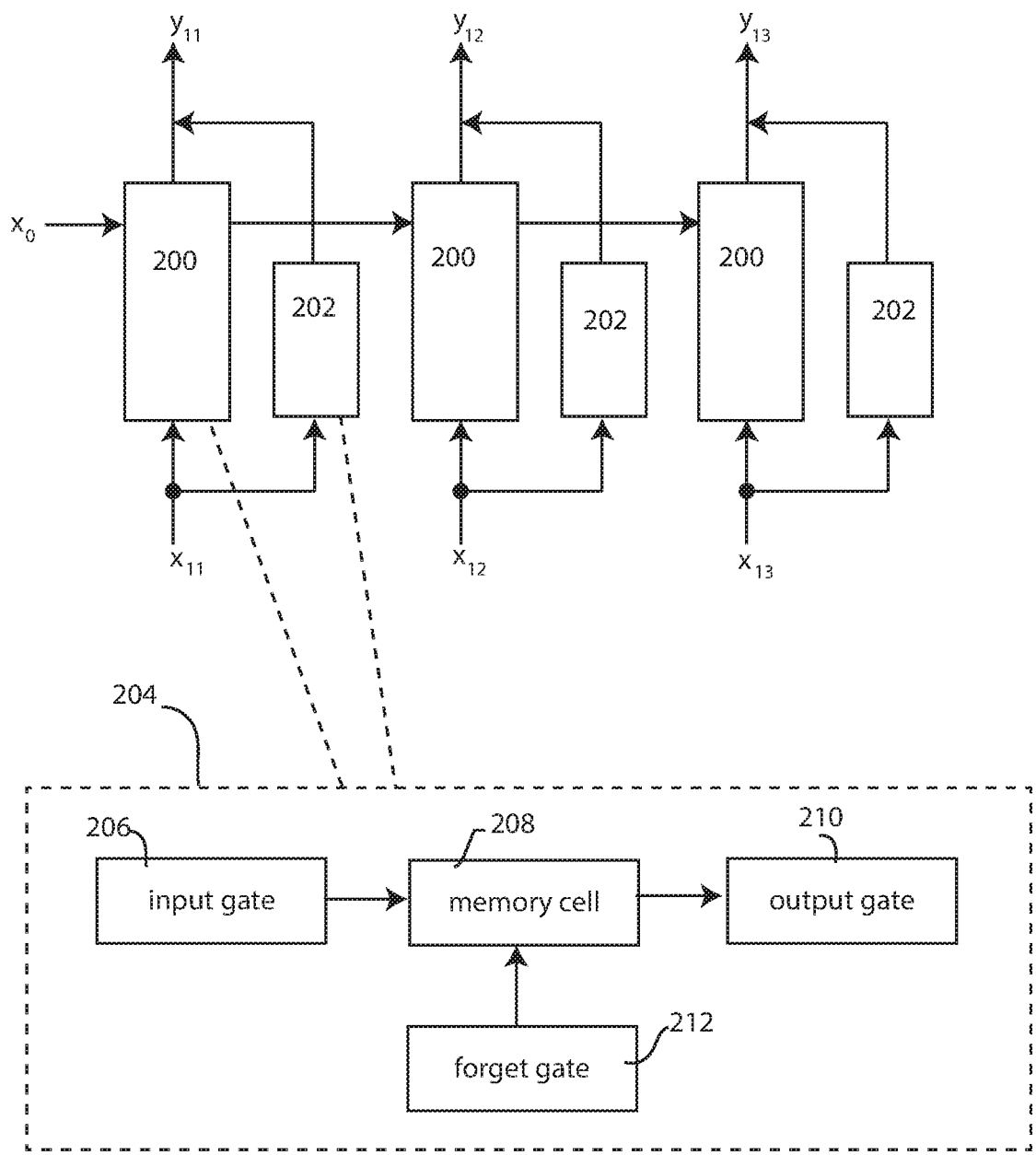
FIG. 4 is a block diagram illustrating an exemplary architecture of the bi-directional LSTM-RNN neural network.

The neural network architecture may be implemented as a bi-directional long short term memory (LSTM) recurrent neural network (RNN) with multiple hidden layers. FIG. 4 illustrates an exemplary bi-directional recurrent neural network comprising a series of forward-propagating layers 200 having inputs x and outputs y, and back-propagating layers 202. The internal structure comprising layers 200 and 202 is illustrated at 204, where the input gate 206 feeds memory gate 208, which is coupled to the output gate 210. The forget gate 212 regulates the memory latency to provide the LSTM behavior. The forward and backward propagation between layers is governed by activation functions within neurons at each node. The individual neurons (not shown) store weights learned during training. The exemplary network illustrated in FIG. 4 is intended merely to show some of the architectural features of the neural network. Although three layers have been illustrated, in a working embodiment the neural network may comprise a different number of layers. Thus in one of the examples discussed below, the bi-directional LSTM-RNN consists of 6 hidden LSTM layers and 2 dense layers, consisting of around 580 neural units.

The inputs to the network are the noisy feature vectors obtained from feature extraction process on the current signal neighborhood. In this disclosure, we consider both single and multi-frame (contextual) approaches, where context is included through the method of ensembling. Through feature selection analysis, input features are selected and made available for training the neural network.

In one embodiment these features were selected from the group consisting of spectral entropy, long-term spectral divergence, signal autocorrelation, and log-power spectra and MFCC derived features (consisting of first and second differences) and combinations thereof. The MFCC derived features are particularly useful to allow the neural network to learn the nonlinear SE mapping. Other features can also be used, depending on the application and its signal processing goals. The genetic algorithm and the evolutionary feature selection process discover, in an automated fashion, what features will produce optimal results.

When configured to perform voice activation detection (VAD), the output of the neural network will be a probability estimate representing the likeliness of speech in the current signal frame being processed. To gain insight into this portion of the network mapping, we first identify as a statistical hypothesis problem.

Let $\vec{Z}$ designate the given input feature vector that the VAD neural model receives. Assuming that the speech signal and the noise are additive, the VAD module has to decide in favor of the two hypothesis:

$$H_1: \vec{Z} = \vec{S} + \vec{N}$$

$$H_0: \vec{Z} = \vec{N}$$

where $\vec{S}$ is a vector of clean features and $\vec{N}$ is additive noise. All three quantities, $\vec{Z}$, $\vec{S}$, and $\vec{N}$, are complex random variables.

A traditional VAD algorithm consists of three stages: 1) Feature extraction, 2) Decision module, 3) decision smoothing. For now, assume a simplified feature space, for instance, one simply based on the spectrum of the current frame (e.g. log-power spectra features). Further, assume that most of the VAD features are based on the current observation frame and consider no contextual information.

We can consider a two-hypothesis test where the optimal decision rule that minimizes the error probability is the Bayes classifier. Given an observation vector to be classified, the problem is reduced to selecting the hypothesis ($H_1$ or $H_0$) with the largest posterior probability $P(H_i|\vec{z})$ where:

$$P(H_1|\vec{z}) \underset{H_0}{\overset{H_1}{\gtrless}} P(H_0|\vec{z})$$

and the notation means: choose $H_1$ if $P(H_1|\vec{z}) > P(H_0|\vec{z})$, otherwise chose $H_0$, where $\vec{z}$ is a vector of actual feature values (or their DFT) as input to the function. Applying Bayes rule leads to the statistical likelihood ratio test:

$$\frac{f(\vec{z}|H_1)}{f(\vec{z}|H_0)} \underset{H_0}{\overset{H_1}{\gtrless}} \frac{P(H_0)}{P(H_1)}$$

where $f(\vec{z}|H_i)$ is the probability density function of $\vec{z}$ given hypothesis $H_i$.

Model the feature set by a vector of DFT coefficients derived from one frame of time-domain speech and noise. Model speech and noise by zero-mean complex-valued Gaussian random variables assuming speech and noise are independent. Further assume noise samples are independent of each other; however, possibly having different variances. Assume speech DFT samples are independent of each other, but samples may have different variances. To complete this description, assume that the real and imaginary components of all complex random variables are independent and are of equal variance.

As set-up, the hypothesis test depends only upon the energy difference between signal plus noise and noise alone and does not account for any other speech features in the decision. The threshold choice (ratio of hypotheses probabilities) sets the energy difference between signal plus noise and noise alone and hence is dependent upon the anticipated SNR. Denote the multi-variable Gaussian densities under hypothesis 0 and 1 by $$f(\vec{z}|H_1) = f_1(\vec{z})$$

$$f(\vec{z}|H_0) = f_0(\vec{z})$$

Derive the hypothesis probability density functions from the multi-variable complex-valued Gaussian density given by:

$$f(\vec{z}; \vec{\mu}, \Gamma) = \frac{e^{-(\vec{z}-\vec{\mu})^* \Gamma^{-1} (\vec{z}-\vec{\mu})}}{|\pi\Gamma|}$$

where $\Gamma = E[(\vec{Z}-\vec{\mu})(\vec{Z}-\vec{\mu})^*]$, $\vec{\mu}$ is the mean of $\vec{Z}$, and vectors are column vectors. Note that if $Z = Z_r + iZ_i$, then $E[|\vec{Z}|^2] = E[Z_r^2] + E[Z_i^2]$ ($E[Z_r Z_i^*] = 0$). Under the above assumptions, $\Gamma$ is a diagonal matrix consisting of the variance of each element of $\vec{Z}$.

Using the above the hypothesis densities become:

$$f_0(\vec{z}) = \frac{e^{-\vec{z}^* \Gamma_n^{-1} \vec{z}}}{|\pi\Gamma_n|} = \frac{e^{-\sum_{k=1}^{J} \frac{|z_k|^2}{\lambda_k^n}}}{\pi^J \prod_{k=1}^{J} \lambda_k^n}$$

$$f_1(\vec{z}) = \frac{e^{-\vec{z}^* \Gamma_{n+s}^{-1} \vec{z}}}{|\pi\Gamma_{n+s}|} = \frac{e^{-\sum_{k=1}^{J} \frac{|z_k|^2}{\lambda_k^n + \lambda_k^s}}}{\pi^J \prod_{k=1}^{J} (\lambda_k^n + \lambda_k^s)}$$

where $\{\lambda_k^n\}$ and $\{\lambda_k^s\}$ are the noise and speech variances respectively. $\Gamma_n$ is the correlation matrix for noise alone and $\Gamma_{n+s}$ is the correlation matrix for noise plus speech.

The next steps are to form the ratio of $f_1$ and $f_0$ and then take the logarithm of the ratio.

$$\frac{f_1(\vec{z})}{f_0(\vec{z})} = \prod_{k=1}^{J} \frac{\lambda_k^n}{\lambda_k^n + \lambda_k^s} e^{\sum_{k=1}^{J} |z|^2 \left(\frac{\lambda_k^s}{\lambda_k^n (\lambda_k^n + \lambda_k^s)}\right)}$$

and define $$\zeta_k \triangleq \frac{\lambda_k^s}{\lambda_k^n} \quad (46)$$

$$\gamma_k \triangleq \frac{|z_k|^2}{\lambda_k^n}$$

then $$\Lambda(\vec{z}) \triangleq \log\left[\frac{f_1(\vec{z})}{f_0(\vec{z})}\right] = -\sum_{k=1}^{J} \log(1+\zeta_k) + \sum_{k=1}^{J} \frac{\gamma_k \cdot \zeta_k}{1+\zeta_k}$$

and the likelihood test becomes $$\Lambda(\vec{z}) \underset{H_0}{\overset{H_1}{\gtreqless}} \log\left[\frac{P(H_0)}{P(H_1)}\right]$$

Another way to write this is $$\sum_{k=1}^{J} \frac{\gamma_k \cdot \zeta_k}{1+\zeta_k} \underset{H_0}{\overset{H_1}{\gtreqless}} \log\left[\frac{P(H_0)}{P(H_1)}\right] + \sum_{k=1}^{J} \log(1+\zeta_k)$$

where the left hand side is the test statistic and the right hand side is independent of the observation.

The result of the model is that the VAD performs binary classification by defining decision boundaries in the identified feature space, with parameters learned from the data. We can think of a similar sort of process happening for the VAD estimate produced by the LSTM RNN model. Based on the training data, which consists of clean and noisy feature vectors of the signals in the audio corpus, the model will iteratively adapt its weights during optimized training process. The computation that takes place within the long short-term memory blocks maintains an internal state or memory which allows the current decisions to rely on inputs received in the past. Several nonlinear functions on the input of each cell in the network determine the update to the cell's internal state as well as propagation of information to other connected cells. All of the parameterized weights in the model are randomly initialized at the start of training process. The input to the neural network consists of 64 features, and the network itself consists of 6 hidden LSTM layers and 2 dense layers, consisting of around 580 neural units.

Evolutionary Feature Selection Using Genetic Algorithm

Prior to training the models, feature analysis is conducted via an evolutionary feature selection algorithm in order to learn minimally redundant, maximally relevant feature subsets for the LSTM-RNN feature space. To this end, a genetic algorithm was developed to evolve a population of feature subsets using two related approaches with the goal of maximizing some notion of statistical distance between speech and non-speech probability distributions. The feasible search space for the algorithm consisted not only of any possible linear combination of the features considered in the previous section, but also the results of linear transformations applied to these (possibly linearly combined) features. The main example of the latter is the formation of eigen-features from projections resulting from the use of PCA and LDA on a given feature subset (individual in the genetic population).

Genetic Algorithm Basics

The genetic algorithm is a randomized search algorithm that operates on string structures (in the present case, string structures of feature parameter values) which evolve in time as the algorithm operates. The genetic algorithm starts with an initial population of individual data points, each represented by a string (of feature parameter values). The initial population can be thought of as the input to the genetic algorithm.

The genetic algorithm is provided with a fitness function that determines how fit an individual data point is vis-a-vis all of the other data points under examination by the genetic algorithm. Effectively, the fitness function calculates a score for each of the individual data points under examination, ranking some higher and some lower than others.

The genetic algorithm is designed to collectively consider the data points in the context of a generation (first generation, second generation, third generation . . . ). Each generation is remarked by the selection phase of the genetic algorithm, in which candidate data points are selected based on having gotten a high fitness function score. Typically, two pairs of data points (parents) are selected based on their fitness scores.

Once a generation is defined, and parent data points are paired off, the genetic algorithm performs a crossover operation. For each pair of parents to be mated, a crossover point in the string of feature parameters is chosen at random. Offspring are then created by exchanging feature parameters one-for-one between parents until the crossover point is reached. Beyond the crossover point the feature parameters are not exchanged.

In certain new offspring, the genetic algorithm can subject individual feature parameters to mutation which changes the value of those parameters. Such mutation maintains diversity in within the population and prevents premature convergence of the genetic algorithm, However, mutation is typically performed sparingly, so that the genetic selection process does not devolve into a fully random search process.

The genetic algorithm may be designed to terminate after a predetermined number of generations. Alternatively, the genetic algorithm may terminate when the process is no longer producing offspring that are significantly different from the previous generation.

Training-Deployment Flowchart

Figure 5:
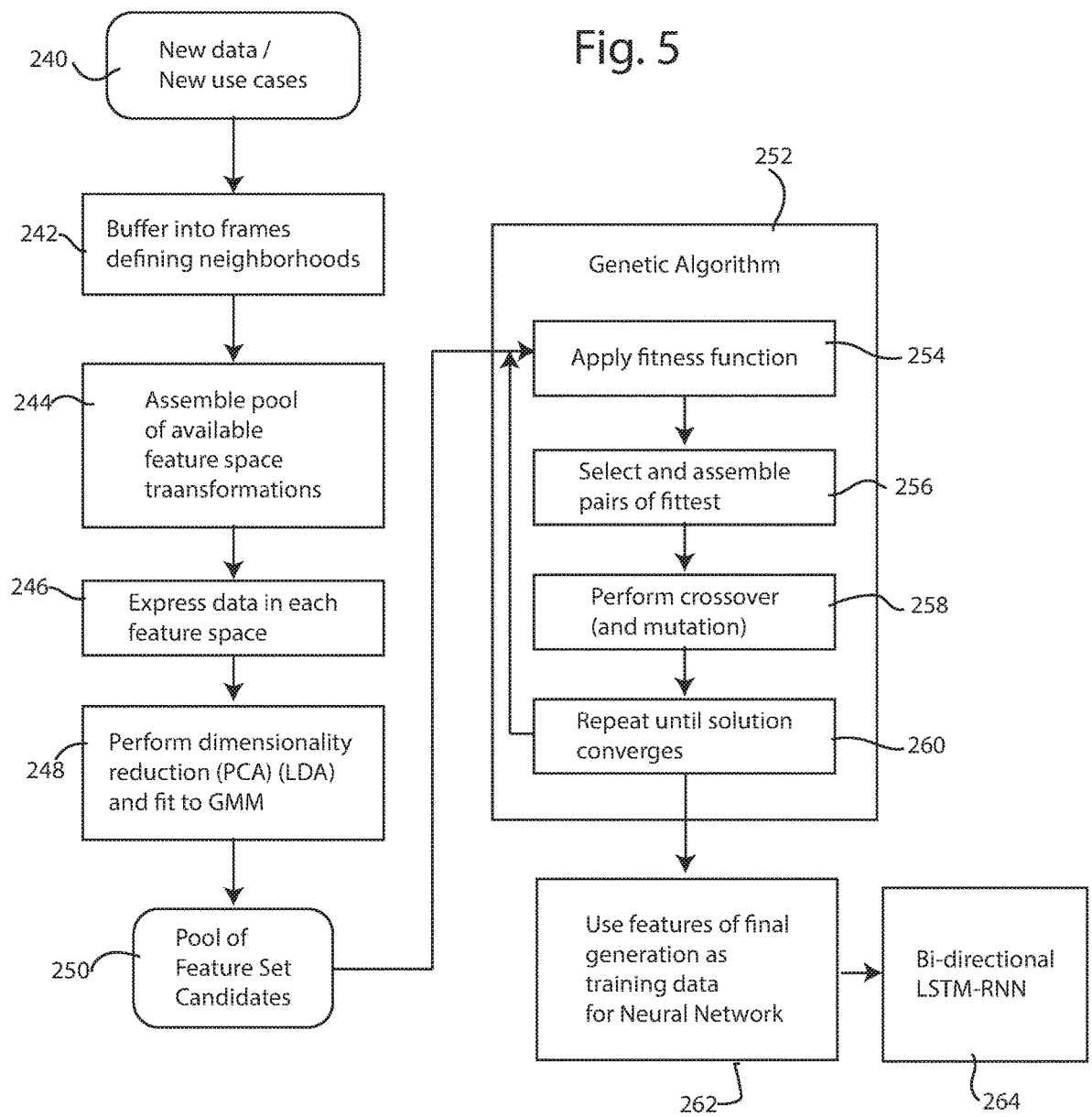
FIG. 5 is a flowchart illustrating the process for generating training data for the neural network, utilizing the genetic algorithm of the evolutionary feature selection and training system.

The training-deployment flowchart for the LSTM-RNN is shown in FIG. 5. When new data, such as raw audio signal data, are made available, as at 240, we first pre-process the raw audio signal data into a sequence of feature matrices (sequenced on a frame by frame basis). Specifically, the data are buffered (stored in memory) and organized into frames as at 242. Adjacent groups of frames constitute a neighborhood.

One goal of the evolutionary selection process is to identify which feature space transformations, when applied to the new data, will produce the most robust results. Thus at step 244, we assemble a pool of available feature space transformations that can be used to transform the raw audio signal data into more useful domain representations. In this regard, the raw audio signal data are likely represented in the time domain. However, through appropriate transformation, the time domain data can be represented in a number of different spectral domains (e.g. frequency domain, frequency domain, etc.), non-spectral domains (e.g. autocorrelation) and combinations thereof. At step 244 the objective is to provide as many available feature space domains as reasonably possible. The genetic algorithm 252 operates to select the most robust feature spaces to meet the signal processing problem at hand.

In order to apply the genetic algorithm 252 to this task, the buffered new data 240, 242 are expressed at 246 in each of the feature spaces represented by the pool assembled at 244. Essentially each representation will take the form of feature parameters, according to the particular feature space transformation formula.

Because each transformation is different, there is no inherent correlation among parameters of different feature sets. Indeed, the number of parameters in each different parameter string may be of unequal length, making the native parameters difficult to directly compare. Thus at step 248 one or more dimensionality reduction operations are performed on the respective parameter strings. In the illustrated example, principal component analysis (PCA) and linear discriminate analysis (LDA) are performed.

Through this processing the resulting strings are organized to emphasize the most influential or most important portions of the resulting strings, allowing the strings to be truncated to reduce the size of the strings and thus reduce downstream processing time. The PCA and LDA results may be combined into a single string or eigenvector corresponding to eigen-features for each transformed new data example.

These eigen-feature are then fitted with a Gaussian Mixture Model (GMM). The Gaussian Mixture Model is helpful in that it creates a common representation whereby all of the different feature sets can be compared. In a use case where the goal is to discriminate between speech and noise, speech data will tend to cluster in one region of the GMM, while some noise data will tend to cluster in a different region of the GMM, and other noise data may not cluster much at all.

Having converted all of the new data into different feature domains, expressed in a common GMM space, the pool of feature set candidates 250 is now fed to the genetic algorithm 252. The genetic algorithm first applies the fitness function, at 254, which is selected based on what the end goal of the neural network processor 264 is designed to accomplish. In the examples here, the goal is to be able to recognize when speech is present in a signal stream, and to help in refining what the noise signature looks like within the signal neighborhood. While a number of different fitness functions are suitable, in general terms a k-fold cross validation score may be used.

Then at 256, the genetic algorithm selects and assembles pairs of fittest (parents), based on their respective fitness function scores. The genetic algorithm then performs crossover (and selectively all performs mutation) at 258 to generate the child generation. The algorithm then determines at 260 whether the genetic algorithm search has converged. If not, the process repeats through successive generations until convergence is achieved, or until a predetermined stopping point has been reached.

The final surviving generation (fittest generation) is then used at 262 to produce the training data for the neural network 264. The trained model may be quantized to the desired level of precision if desired.

There are different ways to develop a fitness function for the genetic algorithm. Illustrated here are two approaches, a first approach using a fitness function derived using a maximum likelihood framework, and a second approach in which the genetic algorithm is placed in situ within a feedback loop that uses k-fold cross validation accuracy score. In this latter approach actual prototype models are trained and tested within the feedback loop.

First Approach: Using Maximum Likelihood Fitness Function

In the first approach, the design of the fitness function followed from a maximum likelihood framework. We encode each individual as a binary string using lexicographic ordering of the feature subsets. Let $\Lambda$ denote the parameter space representing the space of encoded feature subsets. From an MLE perspective, we have a family of distributions $\{f(; \theta) | \theta \in \Lambda\}$ and seek to find:

$$\hat{\theta} = \mathrm{argmax}_{\theta \in A}\{L(\theta; X)\}$$

Or equivalently, we can maximize the expected log-likelihoods $$\hat{\theta} = \mathrm{argmax}_{\theta \in A}\{E[\ln(f(X; \theta))]\}$$

Assuming a uniform prior over the parameter space, this will produce the most probable Bayesian Estimator, and later on will allow us to estimate $P(\theta|X)$ by maximizing $f(X|\theta)P(\theta)$. Now, maximizing the expected log-likelihoods is equivalent to minimizing the Kullback-Leibler divergence between the true data distribution and the conditional parameterized distribution for each individual in the population. Let $D_{KL}(P\theta||Q)$ be the Kullback-Leibler divergence between probability distributions P and Q. This is a relative entropy measure, which, in the case where P and Q are discrete, is defined to be:

$$D_{KL}(P||Q) = \sum_{i} P(i) \ln \frac{P(i)}{!(i)}$$

With this framework in mind, our first approach aims to maximize this Kullback-Leibler divergence by evaluating the fitness as a function of $DKL(P(Xs|\theta)||P(Xn|\theta))$ for each speaker individually, where Xs and Xn are the speech and non-speech signal data for a specific speaker respectively, and $\theta \in \Lambda$ is a given individual (feature subset) being evolved in the algorithm. We also use a second statistical distance measure, known as the maximum mean discrepancy, to measure separability of the speech and non-speech distributions for a given speaker. The maximum mean discrepancy of two probability distributions P and Q is defined as:

$$MMD(P,Q) = ||E_{X \sim P}[\phi(Y)]||_H$$

where X; Y are from a data space $\chi$, H is a kernel Hilbert space, and $\phi: \chi \to H$ is known as a feature map. We then form the fitness function as:

$$F(\theta) = \alpha[D_{KL}(P(X_s|\theta)||P(X_n|\theta))] + (1-\alpha)[MMD(P(X_s|\theta), P(X_n|\theta))]$$

where $\alpha \in [0,1]$ is a constant that controls the relative importance between the Kullback-Leibler and MMD statistical measures. Intuitively, the goal that motivates the design of this fitness function is that we want to simultaneously maximize the measure of relative entropy between the speech and non-speech distributions given a choice of feature subset (encoded as an individual in the genetic population) and also reward feature subsets leading to a higher degree of separability in the feature distributions.

Second Approach: Combining Feature Evaluation with the Learning Algorithm

In the second technique which we considered for feature selection, we combined feature evaluation with the learning algorithm to form a feedback loop in a wrapper style metaheuristic approach. On each iteration, the genetic algorithm performs the next round of subset feature selection and uses the k-fold cross validation accuracy score as its fitness function. For each selected feature set, an LDA and PCA based eigen-feature are computed which are then fitted with a 2-component Gaussian Mixture Model (GMM). A search is then done to find the optimal linear combination of the fitted GMM model parameters that produce an optimal threshold value for classification, which corresponds to maximizing the separability of the two distributions (mixtures of the GMM). A meta-search is then performed in order to discover combinations of feature spaces which can be ensembled together to achieve more accurate results. A training-deployment pipeline of this second approach is shown in FIG. 6.

Figure 6:
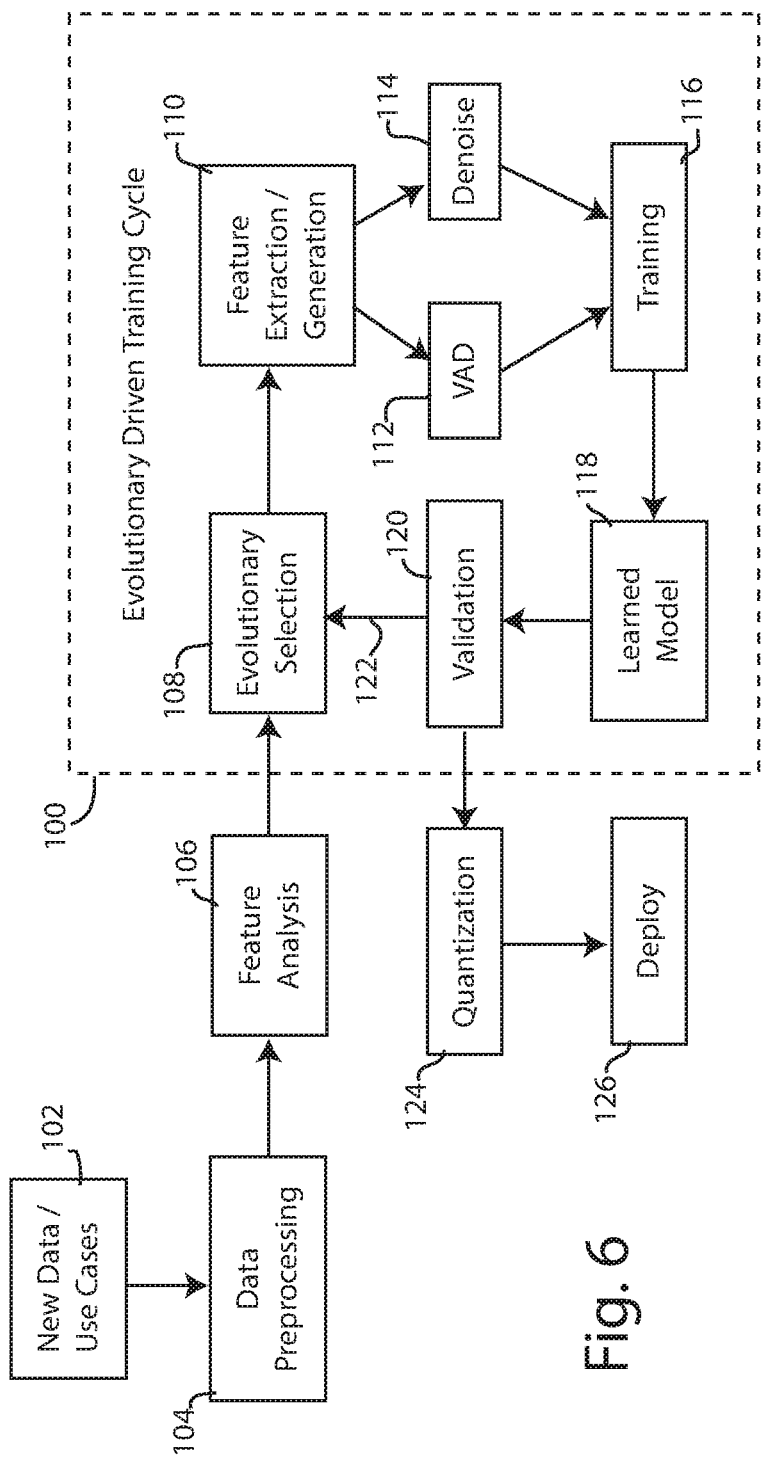
FIG. 6 is a process flow pipeline diagram depicting an embodiment of the evolutionary feature selection and training system, depicting generation of training data for exemplary VAD and SE (denoise) applications.

Referring to FIG. 6, the evolutionary feature selection and training system 70 is shown in greater detail. Specifically, FIG. 6 illustrates how the evolutionary driven training cycle 100 is performed to generate training data for deployment to a run-time system such as that illustrated in FIG. 1. The training and deployment pipeline begins at 102 where new data are made available for existing use cases, or for new use cases. The new data may comprise raw audio data, for example. The new data are first preprocessed at 104 into a sequence of feature matrices (sequenced on a frame by frame basis).

Before the new data are used to train the models, a feature analysis process is performed, beginning at 106. For this analysis, initially a large and diverse collection of different features are assembled to form a feature pool that the evolutionary selection, genetic algorithm assesses to find an optimized set of features that are minimally redundant yet maximally relevant to achieve the goals of the system. The feature pool may consist of (1) spectral-based features, such as long term spectral divergence (LTSD), spectral entropy, cepstral-based features, and the like; (2) non spectral-based features such as autocorrelation-based features, and the like, and (3) combinations thereof.

Because the feature pool is so diverse, the respective feature parameters from the different members of the pool cannot be considered capable of being natively compared with one another, due to the inhomogeneity. To address this, in the feature analysis process 106, each member of the pool is processed using one or more dimensionality reduction techniques, such as principal component analysis (PCA) and Linear Discriminant Analysis (LDA) to form Eigen-features for each member of the feature pool.

Example Feature Set—Cepstral Coefficients

Figure 7:
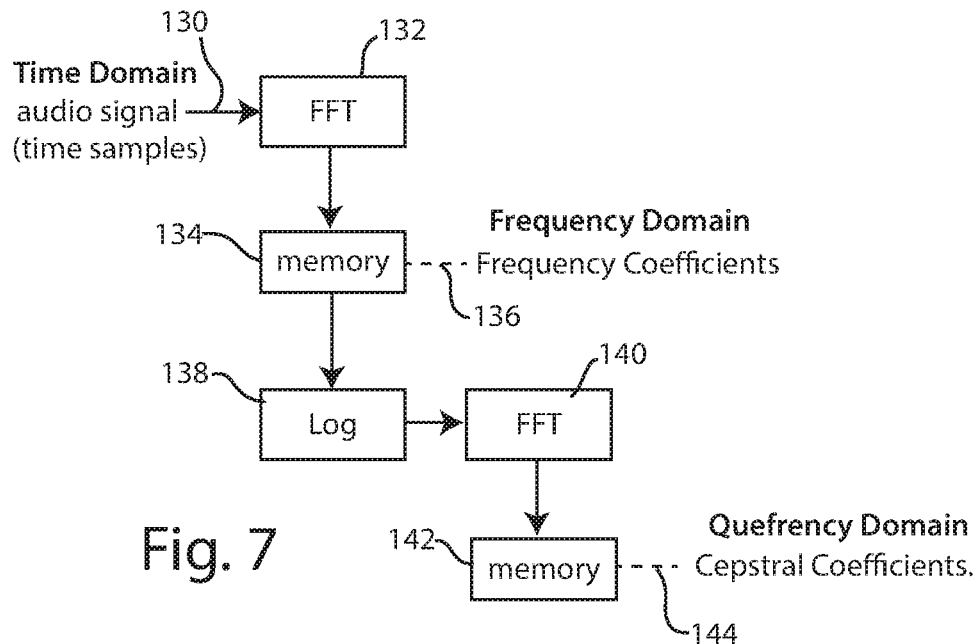
FIG. 7 is a process flow diagram explaining how feature parameters are developed through transformation from one domain to another, in this case illustrating how the frequency domain of cepstral coefficients is generated from time domain audio signal data.

To illustrate, refer to FIG. 7 and consider the case where time domain data 130 containing speech are transformed into cepstral coefficients 144 in the frequency domain. The time domain data are first transformed into frequency coefficients 136 in the frequency domain data, by applying a Fourier transform using FFT processor 142. Such transformation allows the speech signal to be analyzed by what frequencies are present in an utterance. These frequency coefficients stored in memory 134 represent a series of values representing how much signal energy is contained within each of a series of spaced-apart frequencies over which the Fourier transform was computed.

Next the frequency domain data 136 are transformed by taking the log of the magnitude of the frequency coefficients at 138 and then applying an inverse Fourier transform using FFT 140. These operations transform the data into cepstral coefficients 144 in the frequency domain. Representing the speech signal in the frequency domain is useful in analyzing at what frequencies the sound pressure levels peak in a speech utterance.

FIG. 7 is provided by way of introduction, illustrating how one set of feature parameters (cepstral coefficients) are generated from an input time domain signal. The evolutionary feature selection algorithm is designed to operate on a pool of different sets of feature parameters, to select those feature parameters that will be most useful (minimally redundant, maximally relevant) for the given application. In this regard, there are scores of different ways of representing the input signal, cepstral coefficients being just one of them.

Returning to FIG. 6, the feature analysis process 106 performs a homogenization process on the feature parameters in the assembled feature pool, so that the genetic algorithm processor can develop and test different combinations of parameter sets. The individual feature sets and their corresponding feature parameters have no inherent meaning vis-a-vis one another. To address this issue, the analysis process 106 performs several processing steps that allow the otherwise incompatible features to be compared and combined. This process is shown in FIG. F. The goal is to express all feature parameter data in a homogeneous form that allows different combinations and permutations of feature sets to be assessed for efficacy using a predefined fitness function discussed below.

Dimensionality Reduction—Fitted GMM

Figure 8:
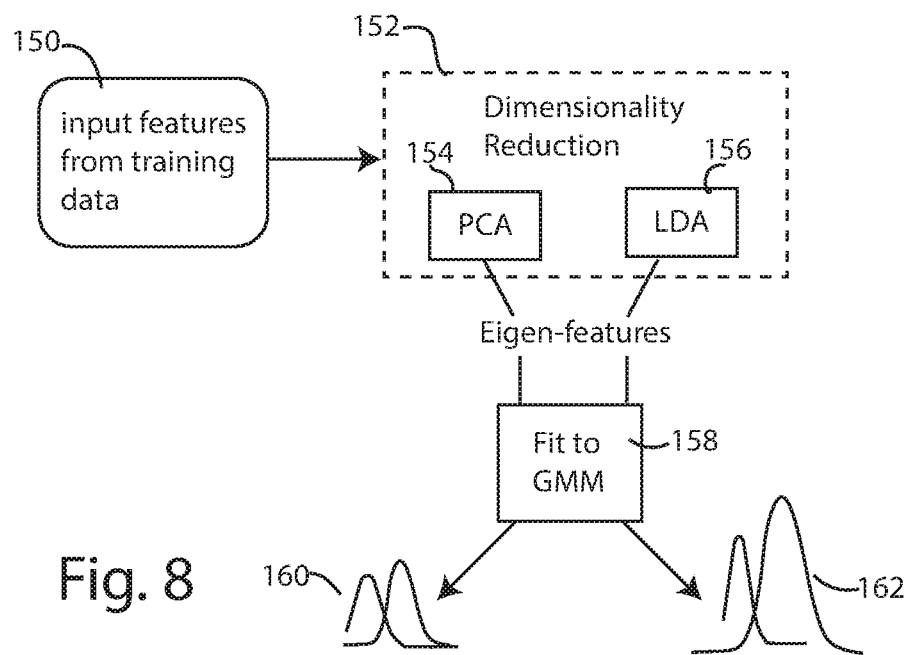
FIG. 8 is a process flow diagram illustrating how dimensionality reduction (e.g., PCA and LDA) are used to fit eigen-features onto a Gaussian Mixture Model (GMM).

Referring to FIG. 8, the input features from training data, supplied at 102 in FIG. 6, undergo one or more dimensionality reduction processes 152 to generate Eigen-features. In the illustrated example in FIG. 8, two dimensionality reduction processes are illustrated, Principal Component Analysis (PCA) 154 and Linear Discriminant Analysis (LDA) are used. Other dimensionality reduction processes can be used as well. PCA reduces a large sequence or vector of feature parameters into a smaller vector comprising the n-most influential (principal) parameters. LDA explicitly attempts to model the difference between the classes of data. Although the techniques are different, the goal of both PCA and LDA is to look for linear combinations of variables which best explain the data.

Finally, to allow these different Eigen-features to be used by the genetic algorithm, the Eigen-features are fitted into a Gaussian mixture model (GMM) as at 158. The GMM offers a way to place the Eigen features in an Eigenspace so that the data representing speech can be readily differentiated from the data representing noise. In FIG. F, the GMM 160 produced by the PCA analysis and the GMM 162 produced by the LDA analysis each have discernible two peaks, corresponding to speech data and noise data, respectively.

Once the features are processed and rendered in the Gaussian mixture model, the evolutionary selection processor 108 is invoked. Since the search space defined by the feature pool is essentially infinite and suffers from the problem of combinatorial explosion, A technique is needed to intelligibly progress through the features subset space in an efficient manner. To this end, the evolutionary processor implements a genetic algorithm that combines feature evaluation with a learning algorithm to form a feedback loop in a wrapper style metaheuristic approach. On each iteration, the genetic algorithm performs the next round of subset feature selection and uses the k-fold cross validation accuracy score as its fitness function. Using the LDA and PCA based Eigen-features, fitted with the Gaussian Mixture Model as discussed above, a search is done to find the optimal linear combination of the fitted GMM model parameters that produce an optimal threshold value for classification. A meta-search is then performed in order to discover combinations of feature spaces which can be ensembled together to achieve more accurate results.

The genetic algorithm thus iteratively evolves subsets of features, evaluating fitness of each individual (feature subset) as a function of the k-fold cross validation score from the model, after having initialized a subset of the population using a custom fitness function discussed below.

In the illustrated example, the genetic algorithm was constructed to evolve a population of feature subsets using two related approaches with the goal of maximizing some notion of statistical distance between speech and non-speech probability distributions. The feasible search space for the algorithm consisted not only of any possible linear combination of the features considered in the previous section, but also the results of linear transformations applied to these (possibly linearly combined) features. The main example of the latter is the formation of eigen-features from projections resulting from the use of PCA and LDA on a given feature subset (individual in the genetic population).

Thus at processing block 110 in FIG. 6, genetically selected features are extracted an used to generate separate data sets suitable for exemplary use cases. In this example, VAD feature data set 112 and Denoise feature data set 114 are generated, these being useful in implementing the circuits of FIGS. B and C respectively. The feature data sets are used by the training processing block 116 to develop learned models 118, which are then tested by the validation processing block 122 using the fitness function. The results of validation are then fed back as at 122 to the evolutionary selection processor 108, with then proceeds to genetically combine the best fitness function scoring features with previously untested features from processing block 106. The process repeats until the genetic algorithm process has discovered and generated the optimal linear combination of the fitted GMM model parameters that produce an optimal threshold value for classification. The evolutionary driven training cycle 100 can be run in this fashion, to also perform a meta-search in order to discover combinations of feature spaces which can be ensembled together to achieve more accurate results.

Once the optimal results have been identified, the results from the validation processor block 120 are quantized at 124 and deployed at 126 as training data for use in the runtime system. Thus the training data deployed at 126 would be used, for example to constitute the speech models 26 and noise models 28 in the exemplary circuits of FIGS. 2 and 3.

The evolutionary driven training cycle 100 in FIG. 6 thus illustrates an example of how feature evaluation is combined with the learning algorithm to form a feedback loop in a wrapper style metaheuristic approach. On each iteration, the genetic algorithm performs the next round of subset feature selection and uses the k-fold cross validation accuracy score as its fitness function. For each selected feature set, an LDA and PCA based eigen-feature are computed which are then fitted with a 2-component Gaussian Mixture Model (GMM). A search is then done to find the optimal linear combination of the fitted GMM model parameters that produce an optimal threshold value for classification, which corresponds to maximizing the separability of the two distributions (mixtures of the GMM). A meta-search is then performed in order to discover combinations of feature spaces which can be ensembled together to achieve more accurate results.

It bears noting that the training cycle illustrated in FIG. 6 has featured two exemplary use cases, voice activation detection (VAD) and speech enhancement (denoise). Other use cases can be similarly implemented.

Feature Space Selection Considerations

Feature space selection is the first component that must be considered in any VAD or SE algorithm design. In the algorithm's processing pipeline, after the signal is buffered into frames, a feature extractor will compute the selected feature parametrics from a subset of frames of the signal known as the signal neighborhood. Some guiding questions to ask when considering design of a new feature spaces are:
1. Which features are the best at discriminating speech/non-speech? How should such discriminability be measured?
2. Which features are the most efficient to compute?
3. What is the applicability of dimension reduction on an identified feature space?
4. For VAD, should the decision mechanism use a frame neighborhood for each decision with each frame's feature vector being taken into account? If so, how to combine into an efficient representation. If not, is a single frame sufficient for the chosen classification mechanism?
5. Is unsupervised feature learning feasible given the domain and available data? If so, how to efficiently represent the derived features? How to derive at test-time?

In what follows, we will answer each of these questions in detail. To do so, it is first natural to separate common features into similar classes based on whether they are spectrally derived or not. We use such a coarse-grained feature class resolution for several reasons. For one, it will enable efficient implementations to be explained naturally for the various features belonging to each respective feature class. For example, many cepstral-based features require computational steps that are common to many spectrum-based features. Similarly, many non-spectral features rely on the autocorrelation of the given signal neighborhoods. Secondly, as a rule-of-thumb, spectrally derived features are more costly to compute in general. Although we do consider feature spaces using a combination of features from both classes, it is enlightening for our purposes to examine the effectiveness of feature spaces composed purely of various non-spectrally derived features for consideration in embedded environments with constrained resources. Finally, when considering the effectiveness of feature vectors extracted from single frames, it useful to distinguish between features which use long-term information and harmonic structure versus those which use local spectral information contained to the given frame.

Spectral-Based Features

Many of the features in this feature class rely on some variation of noise spectral power estimation and subtraction of the form $$|\hat{Y}_k|^2 = |Y_k|^2 - |N|^2$$

where $|\vec{Y}_k|^2$ is the estimated clean speech power spectrum at the k-th frame, and $|N|^2$ is the estimated noise power spectrum. There are several techniques that can be used to estimate the clean power spectrum, one of which will be described in detail in the LTSD based method in the examples section below. Taking a new approach, we propose the use of a deep denoising autoencoder as a replacement for the clean speech power spectrum estimation block.

Let $y(m)=x(m)+n(m)$ where $x(m)$ is the mth sample of the clean signal, $n(m)$ is the mth sample of the additive noise, assumed to be independent of $x(m)$, and $y(m)$ is the resulting mth sample of the corrupted signal. We first apply a short time Fourier transform to the corrupted signal by computing the DFT of the overlapping frames in the signal as given by:

$$Y(k) = \sum_{m=0}^{M-1} y(m)h(m)e^{-\frac{j2\pi km}{M}}$$

where $h(m)$ is the $m^{th}$ sample of the hamming window of length M, and $k=0, 1, \ldots, M-1$ representing the frequency bin index for the DFT.

At first, we will assume that the noise is Gaussian distributed with mean vector and diagonal covariance matrix Σ. We calculate the maximum likelihood estimation of $\{\mu, \Sigma\}$ for performance comparison to our neural network. For the given noisy signal with N total frames observed, the maximum likelihood estimation of $\{\mu, \Sigma\}$ can be obtained by iteratively applying the EM method which has the following update equations for the corresponding GMM model:

$$\hat{\mu} = \frac{\sum_{n=0}^{N}-1 \sum_{m=1}^{M} P(m|Y_l)E[N_l|Y_l,m]}{\sum_{n=0}^{N}-1\sum m=1^M P(m|Y_l)}$$

$$\hat{\Sigma} = \frac{\sum_{n=0}^{N}-1 \sum_{m=1}^{M} P(m|Y_l)E[N_l(N_l)^T|Y_l,m]}{\sum_{n=0}^{N}-1\sum m=1^M P(m|Y_l)} - \hat{\mu}\hat{\mu}^T$$

Given Y (k), the log-power spectra is then defined as:

$$Y_l(k) = \log|Y(k)|^2 \, k = 0, 1, \ldots \frac{L}{2}$$

where for $$\frac{L}{2}+1,$$

..., L-1, we simply have $Y_l(k) = Y_l(M-k)$. The Yl(k), k=1, ..., M log-power spectra feature vector obtained above is the input to the neural network. The output is a vector of length M representing the clean log power spectra estimate computed from the trained network, $\hat{X}_l(k)$. The reconstructed spectrum estimate is then given by:

$$\hat{X}(k) = e^{\frac{\hat{X}_l(k)}{2}} e^{j\phi(k)}$$

where $\phi(k)$ is the phase information obtained from the original noisy signal.

If the estimated signal in the time domain is desired, then from this, a frame of speech signal, $\{\hat{x}(m); m=0, 1 \ldots, M-1\}$, can be reconstructed by computing the inverse DFT of the current frame of the spectrum as given by:

$$\hat{x}(m) = \frac{1}{M}\sum_{k=0}^{M-1} \hat{X}(k) e^{j2\pi km/M}$$

Long-Term Spectral Divergence [LTSD]

Using the estimated clean power spectrum, a number of different techniques are readily available. One intuitive idea is to do this estimation over different sub-bands of the signal, effectively computing all L-band SNRs, where L is the FFT size. Using an estimated power spectrum, the estimate of the long-term upper bounding envelope of the spectrum over a neighborhood of 2K+1 contiguous frames may be computed, for some integer K. This is then in turn used to compute a feature known as the long-term spectral divergence, which is given by:

$$LTSD(Y_k) = 10\log_{10} \sum_{i=1}^{L} \frac{|\hat{Y}_k|^2}{|N_i|^2}$$

$$\hat{Y}_{k,i} = \max\{Y_{k-K,i,\ldots}, Y_{k,i,\ldots}, Y_{k+K,i}\}$$

and where $N_i$ is the $i^{th}$ coefficient of the average noise spectrum.

Spectral Entropy

The spectral entropy [,] measure is found by interpreting the short-time spectrum as a probability distribution over a single discrete random variable X, and then calculating the entropy of the distribution. Spectral distribution is found by normalizing the values of the short-time spectrum:

$$p_X(f) = \frac{s(f)}{\sum_{k=1}^{N} s(k)}$$

where s(f) is the spectral energy for frequency f, and px is the spectral distribution. The spectral entropy for frame, k, is then given by:

$$H(k) = -\sum_{j=1}^{N} p_{X_k}(j)\log(p_{X_k}(j))$$

It is assumed that voiced speech will have relatively low entropy while stationary background noise is expected to have high entropy. However, other various noise signals are expected to have low entropy, such as sirens, alarms, or street noise containing background chatter.

Cepstral-Based Features

Another subclass of spectrally derived features is known as cepstral based features. The cepstrum is essentially the power spectrum of the logpower spectrum. Given the log power spectrum, as derived above, we can compute the power cepstrum for the kth frame as:

$$c_k = 10 \log_{10} ||DFT(\log|Y_l(k)|^2)|^2$$

Several different features derived from the power cepstrum are considered in this disclosure:

1. Cepstral peaks can be used to identify the fundamental frequency, FO, that is, pitch estimation. Cepstral peak:

$$ceps = DCT(\log(|FFT(x)|^2))$$

2. Filtering in cepstral domain, known as liftering, is useful in eliminating the portions of the spectrum more susceptible to degradation from noise. A standard practice is to filter out the low and high cepstral components to yield the Mel-Frequency Cepstral Coefficients (MFCC). MFCC does not capture the harmonic structure of speech, and thus, candidate features to pair with MFCC coefficients are those which succinctly capture the strength of the voicing of the signal.

3. The first and second finite differences of the spectrum may be used as features. The so-called delta cepstrum is defined as:

$$\Delta c_k = \sum_{i=1}^{m} k(c_{k+1} - c_{k-i}) / \left(2 \sum_{i=1}^{M} i^2\right)$$

Non-Spectral Features: Autocorrelation-Based Features

Another characteristic of speech data that can be exploited is periodicity. Intuitively, we should reasonably expect that segments of the audio signal containing voice will present repeated patterns, which can be captured by computing autocorrelation of the signal. While this is a promising approach in cases where the signal is corrupted by additive white gaussian noise, autocorrelation will unfortunately pick up on any self-similarity or periodicity of the noise signal itself, which limits its usefulness against some noise cases like alarms and sirens. The standard unnormalized autocorrelation is:

$$a_j[k] = \sum_{n=k}^{N} x_j[n]x_j[n-k]$$

where $x_j$ is the $j^{th}$ frame of the signal and k is the lag.

For our purposes, we will be interested in the deterministic normalized autocorrelation of a short-time windowed segment x(n), which is gain invariant, and is given by $$r_{xx}(t, k) = \frac{\sum_{j=0}^{N-1} x(j)w(j)x(j+k)w(j+k)}{\sum_{j=0}^{N-1} w(j)w(j+k)}$$

where w(j) is a Hanning window, and t and k are frame and autocorrelation lag indices, respectively. A number of related features can be easily derived from this measure.

A number of related features can be easily derived from this measure, such as the maximum autocorrelation peak, which finds the magnitude or power of the maximum peak within the range of lags that correspond to the range of fundamental frequencies of male and female voices, which is typically estimated to be around [50,4000] Hz. A related feature is a measure known as harmonicity, which is defined as the relative height of the maximum autocorrelation peak. Mathematically, it can be expressed as $$h(t) = \frac{r_{xx}(t, k_{m}ax)}{r_{xx}(t, 0) - r_{xx}(t, k_{max})}$$

$$k_{max} = \underset{pitch_{min} \leq k \leq pitch_{max}}{\operatorname{argmax}} r_{xx}(t, k)$$

Another autocorrelation based measure is known as the Average Magnitude Difference Function Valley (AMDF), which is given by:

$$D(t,k) = \beta \sqrt{(2[r_{xx}(t,0) - r_{xx}(t,k)])}$$

for some constant scale factor $\beta$. The clarity is then extracted as $$c(t) = 1 - \frac{D(t, k_{min})}{D(t, k_{max})}$$

$$k_{min} = \underset{pitch_{min} \leq k \leq pitch_{max}}{\operatorname{argmax}} D(t, k)$$

We can define several features based on the AMDF measure, the most popular of which is known as clarity of the signal, which is defined as the relative depth of the minimum Average Magnitude Difference Function Valley (AMDF) over the plausible pitch range.

The prediction gain is defined as the ratio of the signal energy to the linear prediction (LP) residual signal energy. The signal energy of a given signal frame can be derived from its autocorrelation using zero lag. In order to calculate the LP residual signal energy, the Levinson-Durbin recursion is applied and the error from the last step yields the energy of the residual signal. The prediction gain is then computed as:

$$G_p(t) = \log(r_{xx}(t,0)/e^p)$$

where $e^p$ is the error in the last step of the recursion, and p is the order of LP analysis.

Combined Features

Since autocorrelation based features can fail in environments that have repetitive noise, it is worth exploring combined features from multiple domains to enable more noise-robust techniques. In the spectrum for instance, the harmonic structure of voiced speech appears as a train of spectral peaks, each of which is in multiple of the fundamental frequency. Towards this end, filtering can be done through inverse linear predictive coding (LPC), with the maximum autocorrelation peak of the residual signal taken as a representative characterization.

In the Short-Term Fourier Transform (STFT) domain, the harmonics of the pitch frequency for voice frames become evident in the magnitude spectrum of the signal. The STFT is formed by taking the DFT from Hamming windowed buffered signal frames with possible zero padding. This observation serves as the basis for the harmonic product spectrum technique which has been utilized for noise-robust pitch detection. The HPS in the log-spectral domain is defined as:

$$P(T,\omega) = \Sigma_{l=1}^{R} \log|X(t,l\omega)|$$

where R is the number of frequency-compressed copies of the original spectrum.

The periodicity is computed as the maximum peak of P(t; !) in the plausible pitch range:

$$P_{hps}(t) = P(t, \omega_{max})$$

$$\omega_{max} = \underset{voicefreq_{min} \leq \omega \leq voicefreq_{max}}{\operatorname{argmax}}$$

Over short-time frames, speech is a quasi-stationary slowly varying signal and the spectrum does not therefore change rapidly from one frame to another. This can be exploited to detect speech from more rapidly changing sounds.

One final observation that we can exploit to identify speech signals is the fact that, in the spectral domain, speech doesn't fluctuate as rapidly as compared to many traditionally analyzed noise sources. This observation becomes more emphasized if we shorten the length of our signal frames, and in fact, speech will appear to become stationary if sufficiently small frames are used. The spectral flux is one way in which we can seek to capture the degree of variation in the spectrum across time. The spectral flux is defined as:

$$SF_p(t) = X_m(t,\omega) = X_m(t-1,\omega)_1$$

where $X_m(t,\omega)$ is the energy normalized mel-spectrum at frame t which is calculated using a 64-channel mel-filter bank. Upon inspection of this feature through our simulations, it is apparent that there are deep valleys which form in the spectral flux profile when speech data is present, whereas for background noise it attains a maximum value. Accordingly, we employ the negative of this parameter as a feature for discrimination.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method for using a neural network to process speech signals, comprising:

providing a corpus of data containing speech and non-speech;

providing a collection of feature sets, each representing a different way to express a signal to be processed in terms of a feature vector;

performing evolutionary feature selection using a genetic algorithm to evolve from the collection of feature sets, a subset collection of feature sets that maximizes a distribution distance between the speech and the non-speech;

extracting from the corpus of data, features corresponding to the subset collection of feature sets to develop training data;

applying the training data to a neural network to develop a learned model;

performing validation of the learned model and iteratively repeating the performing of the evolutionary feature selection if the learned model does not meet a pre-defined stopping threshold; and deploying the learned model in a processing system configured to extract from an input signal features, corresponding to the subset collection of feature sets, to be processed by the neural network based on the learned model.

2. The method of claim 1 wherein the extracting features to develop training data comprises using a plurality of different speech signal processing application specific models to develop the training data representing each of the plurality of different speech signal processing applications.

3. The method of claim 1 wherein the performing validation is performed by evaluating k-fold cross validation scores of the learned model.

* * * * *